United States Patent
Chen

(10) Patent No.: US 10,291,892 B2
(45) Date of Patent: May 14, 2019

(54) WHITE BALANCE METHOD OF FOUR-COLOR PIXEL SYSTEM

(71) Applicant: Shenzhen China Star Optoelectronics Technology Co., Ltd., Shenzhen (CN)

(72) Inventor: Lixuan Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/897,665

(22) PCT Filed: Sep. 8, 2015

(86) PCT No.: PCT/CN2015/089134
§ 371 (c)(1),
(2) Date: Feb. 2, 2018

(87) PCT Pub. No.: WO2017/035849
PCT Pub. Date: Mar. 9, 2017

(65) Prior Publication Data
US 2018/0160091 A1 Jun. 7, 2018

(30) Foreign Application Priority Data
Aug. 31, 2015 (CN) .......................... 2015 1 0546100

(51) Int. Cl.
*H04N 9/73* (2006.01)
*H04N 1/46* (2006.01)
*G09G 3/36* (2006.01)
*H04N 9/69* (2006.01)

(52) U.S. Cl.
CPC ............. *H04N 9/73* (2013.01); *G09G 3/3607* (2013.01); *H04N 9/69* (2013.01); *G09G 2300/0452* (2013.01); *G09G 2320/0666* (2013.01); *G09G 2320/0693* (2013.01); *G09G 2340/06* (2013.01)

(58) Field of Classification Search
CPC ........ H04N 1/60; H04N 1/608; H04N 1/6077; H04N 13/0025; H04N 9/735; H04N 9/69; H04N 9/73; G09G 2320/0666; G09G 3/3607; G09G 2340/06; G09G 2320/0693; G09G 2300/0452
USPC ...................................... 348/223.1
See application file for complete search history.

(56) References Cited

U.S. PATENT DOCUMENTS

| | | | | |
|---|---|---|---|---|
| 8,743,140 | B2* | 6/2014 | Dai | G09G 3/3648 345/589 |
| 9,251,761 | B2* | 2/2016 | Shigeta | G01J 3/506 |
| 9,478,179 | B2* | 10/2016 | Roth | G09G 3/3607 |
| 2002/0191130 | A1* | 12/2002 | Liang | G02F 1/133514 349/108 |

(Continued)

*Primary Examiner* — Ngoc Yen T Vu
(74) *Attorney, Agent, or Firm* — Andrew C. Cheng

(57) ABSTRACT

A white balance method of a four-color pixel system is disclosed. The method includes the following steps: lightening a plurality of sub pixel units according to two different combinations respectively so as to display a white color; and regulating a gray-scale value of each sub pixel unit, and taking the gray-scale values of each of the sub pixel units, which enable the white color displayed by two different combinations to meet respective preset conditions as output four color gray-scale values. The display effect of the four-color pixel system can be improved through the method, which is simple, efficient, and easy to perform.

11 Claims, 2 Drawing Sheets

(56) References Cited

U.S. PATENT DOCUMENTS

2006/0142639 A1\* 6/2006 Takahashi ......... A61B 1/00059
600/117
2017/0047021 A1\* 2/2017 Yashiki ................... G09G 3/34

\* cited by examiner

WHITE BALANCE METHOD OF FOUR-COLOR PIXEL SYSTEM

CROSS REFERENCE TO RELATED APPLICATION

The present application claims priority of Chinese patent application CN201510546100.9, entitled "White Balance Method of Four-color Pixel System" and filed on Aug. 31, 2015, the entirety of which is incorporated herein by reference.

FIELD OF THE INVENTION

The present disclosure relates to the technical filed of liquid crystal display, and particularly to a white balance method of four-color pixel system.

BACKGROUND OF THE INVENTION

In a commonly used three-color pixel system, taking a liquid crystal display (LCD) device as an example, each pixel unit is generally composed of three sub pixel units, i.e., a red (R) sub pixel unit, a green (G) sub pixel unit, and a blue (B) sub pixel unit. In a new four-color pixel system, one sub pixel unit is added to the traditional three-color pixel system, and thus a color performance of the four-color pixel system can be improved.

With the development of the four-color pixel system, the three-color to four-color conversion technology is basically mature, and the corresponding product has entered into actual using stage. However, since there is no effective white balance regulation technology for the product with the four-color pixel system, the display effect of the product is not desirable. As a result, the advantage of four-color pixel system is not fully played.

FIG. 1(a) shows Gamma curves of a four-color pixel system in the prior art, and FIG. 1(b) shows a standard Gamma curve when white color is displayed. As shown in FIG. 1(a), curves 1, 2, 3, and 4 are respectively Gamma curves of an LCD with a four-color pixel system when red color, green color, blue color, and white color are displayed. The standard Gamma curve when white color is displayed should fall within a range of ±0.2~0.3 with 2.2 as a mid value, so that the brightness change of the white color is in accordance with the perceptual curve of eye, as shown in FIG. 1(b). The brightness change of the four curves as shown in FIG. 1(a) all seriously deviate from the aforesaid range at relatively high gray-scale values, and thus an over-bright display effect would be generated.

In a word, a white balance method of a four-color pixel system is needed so that the color displayed therein is in accordance with the perceptual curve of eye.

SUMMARY OF THE INVENTION

The present disclosure provides a white balance method of a four-color pixel system, so that the color displayed therein is in accordance with the perceptual curve of eye.

In order to solve the technical problem, the embodiment of the present disclosure provides a white balance method of a four-color pixel system, wherein the four-color pixel system comprises a red sub pixel unit, a green sub pixel unit, a blue sub pixel unit, and a fourth sub pixel unit. The method comprises following steps: lightening a plurality of sub pixel units according to two different combinations respectively based on an input white gray-scale value so as to display a white color; and regulating gray-scale values of each of the sub pixel units, and taking the gray-scale values of each of the sub pixel units, which enable the white color displayed by two different combinations to meet respective preset conditions, as output four color gray-scale values corresponding to the input white gray-scale value.

Preferably, gray-scale values of the red sub pixel unit, the green sub pixel unit, and the blue sub pixel unit, which enable a brightness of a white color displayed by a first combination to be equal to a brightness of a white color corresponding to the input white gray-scale value and in accordance with a Gamma curve, and a chromaticity coordinate of a white color displayed by a second combination to be equal to a chromaticity coordinate of a benchmark white color, are taken as an output gray-scale values corresponding to the input white gray-scale value.

Preferably, an output gray-scale value of the fourth sub pixel unit is obtained according to a three-color to four-color calculation algorithm of the four-color pixel system and based on the output gray-scale values of the red sub pixel unit, the green sub pixel unit, and the blue sub pixel unit.

Preferably, during a regulation procedure of the gray-scale value of each sub pixel unit, a mapping relationship between the gray-scale value of the fourth sub pixel unit and the gray-scale values of the red sub pixel unit, the green sub pixel unit, and the blue sub pixel unit is maintained in accordance with the three-color to four-color calculation algorithm of the four-color pixel system.

Preferably, during the regulation procedure of the gray-scale value of each sub pixel unit, the gray-scale value of the fourth sub pixel unit is maintained unchanged.

Preferably, the first combination comprises the red sub pixel unit, the green sub pixel unit, the blue sub pixel unit, and the fourth sub pixel unit, and the second combination comprises the red sub pixel unit, the green sub pixel unit, and the blue sub pixel unit.

Preferably, the brightness of the white color displayed by the first combination is obtained according to stimulus values Y of each of the sub pixel units of the first combination, and the chromaticity coordinate of the white color displayed by the second combination is obtained according to tri-stimulus values XYZ of each of the sub pixel units of the second combination.

Preferably, the gray-scale value of each sub pixel unit is regulated according to formulas as follows:

$$\begin{cases} L_v(W_i) = Y(R_o) + Y(G_o) + Y(B_0) + Y(M_i) \\ x_i = (X(R_o) + X(G_o) + X(B_o))/S \\ y_i = (Y(R_o) + Y(G_o) + Y(B_o))/S \\ M_i = f(R_i, G_i, B_i) \\ M_o = f(R_o, G_o, B_o) \end{cases},$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + Y(B_o) + Z(B_o) \end{cases}$$

wherein $L_v(W_i)$ represents a brightness of a white color with a gray-scale value being i; $x_i$, $y_i$ represent chromaticity coordinates of the white color; $R_i, G_i, B_i, M_i$ represent four color gray-scale values obtained through an input three color gray-scale value after conversion according to the three-color to four-color calculation algorithm; $R_o, G_o, B_o, M_o$ represent output four color gray-scale values; $X(\square), Y(\square), Z(\square)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

Preferably, the brightness of the white color displayed by the first combination is obtained according to stimulus values Y of the red sub pixel unit, the green sub pixel unit, the blue sub pixel unit, and the fourth sub pixel unit, and the chromaticity coordinate of the white color displayed by the second combination is obtained according to tri-stimulus values XYZ of each of the four sub pixel units.

Preferably, the gray-scale value of each sub pixel unit is regulated according to a formula as follows:

$$\begin{cases} L_v(W_i) = Y(R_o) + Y(G_o) + Y(B_o) + Y(M_o) \\ x_i = (X(R_o) - X(G_o) + X(B_o) + X(M_o))/S \\ y_i = (Y(R_o) + Y(G_o) + Y(B_o) + Y(M_o))/S \\ M_o = f(R_o, G_o, B_o) \end{cases},$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + \\ Y(B_o) + Z(B_o) + X(M_o) + Y(M_o) + Z(M_o) \end{cases}$$

wherein $L_v(W_i)$ represents a brightness of a white color with a gray-scale value being i; $x_i$, $y_i$ represent chromaticity coordinates of the white color; $R_o, G_o, B_o, M_o$ represent output four color gray-scale values; $X(\_), Y(\_), Z(\_)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

Compared with the prior art, one embodiment or a plurality of embodiments according to the present disclosure can have the following advantages or beneficial effects.

The four-color pixel system can be regulated through lightening sub pixel units according to two different combinations so as to achieve white balance, whereby a display effect of the four-color pixel system can be improved. The method is simple, has a high efficiency, and is easy to perform.

Other advantages, objectives, and features of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure or the prior art, and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

An input signal of a four-color pixel system is the same as that of a three-color pixel system, which is a group of data representing gray-scale values of red color (R), green color (G), and blue color (B). When driving a red sub pixel unit, a green sub pixel unit, a blue sub pixel unit, and a fourth sub pixel unit taking advantage of input RGB gray-scale values, the input three color gray-scale values should be mapped into output four color gray-scale values. Different four-color pixel systems have different built-in algorithms. For example, a smallest value of the input three color gray-scale values can serve as a gray-scale value of the fourth sub pixel unit, which is the simplest mapping method. The basic requirement for the four-color pixel system lies in that, a light transmittance of the display panel can be improved, and at the same time, the color displayed therein is the same as the color displayed by the original three-color pixel system. During white balance debugging procedure of the four-color pixel system, it should be ensured that the four color gray-scale values which are used for driving each of the sub pixel units enable the color displayed by the four-color pixel system is the same as the color displayed by the original three-color pixel system.

Figure 1A:
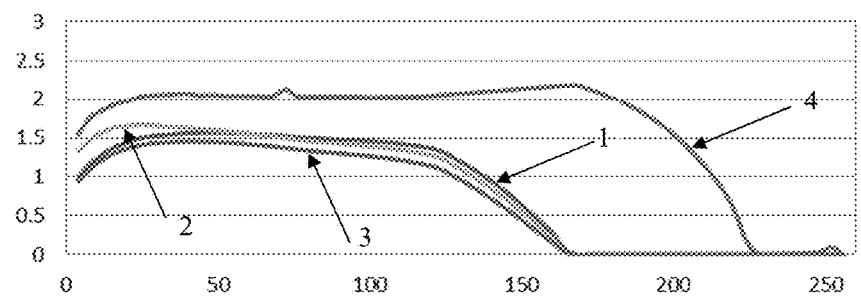
FIG. 1(a) shows Gamma curves of a four-color pixel system in the prior art.
Figure 1B:
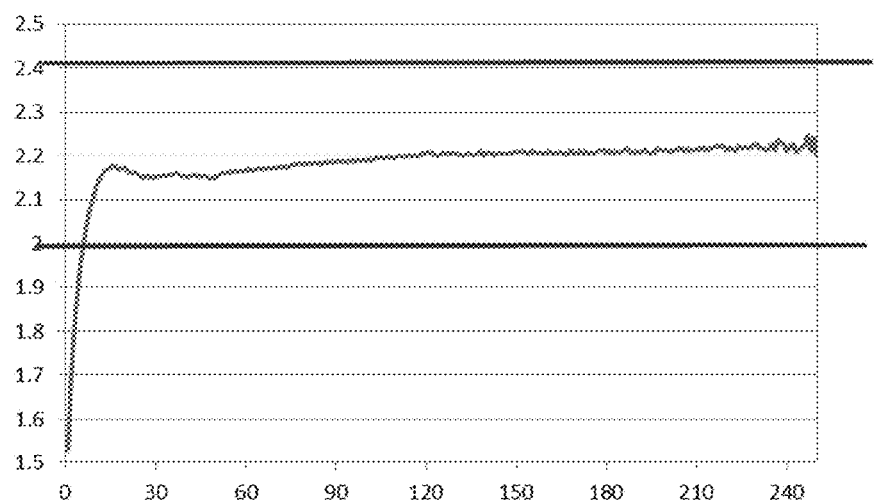
FIG. 1(b) shows a standard Gamma curve when white color is displayed.
Figure 2:
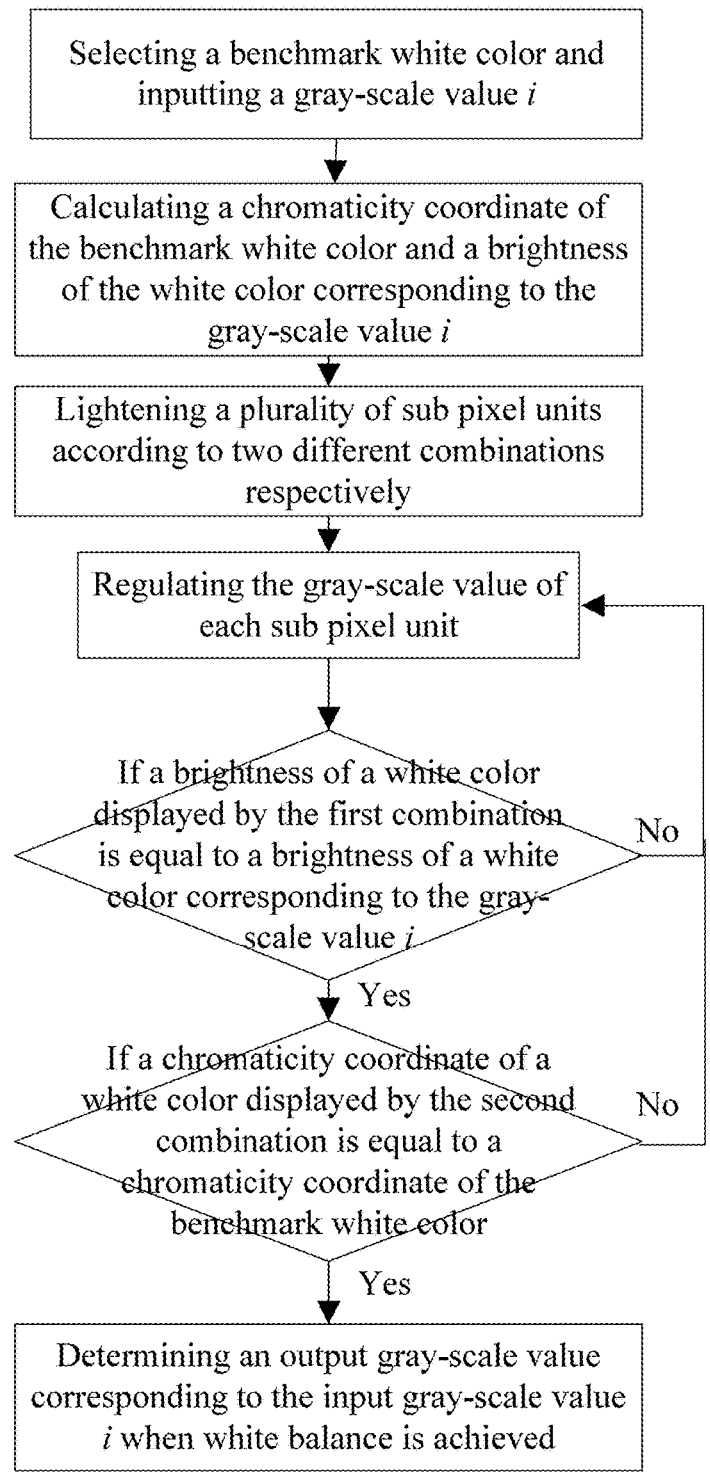
FIG. 2 is a flow chart of a white balance method of a four-color pixel system according to one embodiment of the present disclosure.

FIG. 2 is a flow chart of a white balance method of a four-color pixel system according to one embodiment of the present disclosure. The method will be illustrated in detail hereinafter with reference to FIG. 2.

A white color shall be selected to serve as a debugging standard before the white balance debugging procedure. That is, in the following white balance debugging procedure, the debugging target is to enable a white color display therein to be the same as a standard white color. When selecting the standard white color for debugging, factors in many aspects should be taken into consideration, such as a display performance of an actual four-color pixel system, using environment of the four-color pixel system, visual requirement of an audience, and so on.

If the input signal of the four-color pixel system has 24 bits, 8 bits thereof represent the gray-scale value of one color of red color, green color, and blue color. When the gray-scale value of red color is the same as that of green color and the same as that of blue color, white color is displayed on the system. When white color is displayed on the four-color pixel system, 256 different gray-scale values are shown. The input gray-scale value and an output brightness should in accordance with Gamma curve when white balance is reached.

Therefore, when different input white gray-scale values are debugged, the white color should be the same as the standard white color, and a brightness of the white color should be equal to a brightness of a white color corresponding to the input white gray-scale value and in accordance with Gamma curve. Further, according to the present disclosure, different sub pixel units are lightened according to different combinations, and the color and brightness of white color are debugged according to the white color displayed by different combinations, so that white balance of the four-color pixel system can be achieved.

According to one embodiment of the present disclosure, at first, four sub pixel units are lightened at the same time, and the brightness of the white color when white balance of the four-color pixel system is achieved is debugged according to the white color displayed by this combination. Then, the red sub pixel unit, the green sub pixel unit, and the blue sub pixel unit are all lightened at the same time, and chromaticity coordinates of the white color when white balance of the four-color pixel system is achieved is debugged according to the chromaticity coordinates of the white color displayed by this combination. Specifically, it is assumed that, the four color gray-scale values $R_i$, $G_i$, $B_i$, and $M_i$ which are used for lightening each of the sub pixel units are obtained through the input gray-scale values i of red color, green color, and blue color after calculation according to a three-color to four-color calculation algorithm of the four-color pixel system. Tri-stimulus values XYZ of each sub pixel unit in different combinations can be measured respectively by a color analyzer. The brightness $L_v(W_i)$ of the white color displayed by the four sub pixel units in the first combination can be calculated based on the measured tri-stimulus values XYZ thereof. The chromaticity coordinates $x_i$, $y_i$ of the white color displayed by the three sub pixel units in the second combination can be calculated based on the measured tri-stimulus values XYZ thereof.

It should be noted that, since the four-color pixel system operates based on the three-color to four-color calculation algorithm in the system, the gray-scale value M' which is used for lightening the fourth sub pixel unit strongly depends on the gray-scale values R',G',B' which are used for lightening the other three sub pixel units. Based on the three-color to four-color calculation algorithm of the four-color pixel system, a mapping relationship f from the gray-scale values of the red sub pixel unit, the green sub pixel unit, and the blue sub pixel unit to the gray-scale value of the fourth sub pixel unit can be further obtained. When the mapping relationship is a linear relationship, a relation of the gray-scale value M' of the fourth sub pixel unit and the gray-scale values R',G',B' of the other three sub pixel units can be expressed as:

$$M' = a_1 \cdot R' + a_2 \cdot G' + a_3 \cdot B' \quad (1)$$

When coefficients $a_1$, $a_2$, and $a_3$ are all constants, M' can be obtained by R',G',B' through linear transformation. At this time, the chromaticity coordinates of the white color can be debugged according to the red sub pixel unit, the green sub pixel unit, and the blue sub pixel unit, while the influence of the fourth sub pixel unit on the chromaticity coordinates of the white color is transferred to other three sub pixel units through the coefficients $a_1$, $a_2$, and $a_3$. According to this debugging method, a requirement for debugging accuracy can be met, a restricting condition can be simplified, and a debugging complexity thereof can be reduced.

If the brightness $L_v(W_i)$ of the white color displayed by the first combination is not in consistent with the brightness of the white color on the Gamma curve corresponding to the gray-scale value i, and/or the chromaticity coordinates $x_i$, $y_i$ of the white color displayed by the second combination are not in consistent with the chromaticity coordinates of the standard white color, the gray-scale value of each sub pixel unit or part of sub pixel units should be regulated. Then, the tri-stimulus values XYZ of each sub pixel unit should be measured, and the brightness $L_v(W_i)$ and the chromaticity coordinates $x_i$, $y_i$ of the white color displayed therein shall be calculated and compared with the benchmark values once again. After multiple times of regulation, measurement, compare and determination, the brightness $L_v(W_i)$ and the chromaticity coordinates $x_i$, $y_i$ of the white color displayed therein are both in accordance with the preset conditions. At this time, it is considered that the white balance can be achieved when the gray-scale value is i, and the gray-scale values $R_o, G_o, B_o, M_o$ of each sub pixel unit serve as output gray-scale values corresponding to the input white gray-scale value i. The aforesaid procedure can be expressed by formulas (2) as follows:

$$\begin{cases} L_v(W_i) = Y(R_o) + Y(G_o) + Y(B_0) + Y(M_i) \\ x_i = (X(R_o) + X(G_o) + X(B_o))/S \\ y_i = (Y(R_o) + Y(G_o) + Y(B_o))/S \\ M_i = f(R_i, G_i, B_i) \\ M_o = f(R_o, G_o, B_o) \end{cases} \quad (2)$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + Y(B_o) + Z(B_o) \end{cases}$$

wherein $L_v(W_i)$ represents a brightness of a white color with a gray-scale value being i; $x_i$, $y_i$ represent chromaticity coordinates of the white color; $R_i, G_i, B_i, M_i$ represent four color gray-scale values obtained through an input three color gray-scale value after conversion according to the three-color to four-color calculation algorithm; $R_o, G_o, B_o, M_o$ represent output four color gray-scale values; $X(-), Y(-), Z(-)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

It can be seen from formula (2) that, during the procedure of regulating the gray-scale value of each sub pixel unit according to the brightness of the white color, the gray-scale value which is used for lightening the fourth sub pixel unit is maintained unchanged. That is, the gray-scale value for lightening the fourth sub pixel unit is maintained to be $M_i$, which is the first gray-scale value for lightening the fourth sub pixel unit. This is a simplified processing method. It is shown by experiment that, when the four-color pixel system has a good linearity, a needed accuracy can be achieved by the above debugging method.

Further, if the four-color pixel system has an apparent nonlinearity, in order to meet the requirement for debugging accuracy, during a regulation procedure of the gray-scale value of each sub pixel unit, a mapping relationship between a gray-scale value of the fourth sub pixel unit and gray-scale values of the red sub pixel unit, the green sub pixel unit, and the blue sub pixel unit is maintained in accordance with the three-color to four-color calculation algorithm of the four-color pixel system. That is, $M_o = f(R_o, G_o, B_o)$. At this time, a first equation in formula (2) is as follows:

$$L_v(W_i) = Y(R_o) + Y(G_o) + Y(B_o) + Y(M_o) \quad (3)$$

During the debugging procedure, $M_o$ changes with the changing of $R_o,G_o,B_o$, but the mapping relationship is maintained unchanged.

It should also be noted that, according to formula (2), after the debugging procedure, an output gray-scale value of the fourth sub pixel unit can be obtained through calculation based on the mapping relationship f and the output gray-scale values $R_o$, $G_o,B_o$ of the red sub pixel unit, the green sub pixel unit, and the blue sub pixel unit, i.e., $M_o=f(R_o,G_o,B_o)$. In this manner, the finally obtained output gray-scale values of the four sub pixel units can not only meet the requirement of white balance, but also in accordance with the three-color to four-color calculation algorithm of the four-color pixel system, and it can be ensured that the color displayed therein does not change after three-color to four-color conversion.

According to another embodiment of the present disclosure, four sub pixel units are lightened at the same time, and the brightness and the chromaticity coordinates of the white color when white balance is achieved in the four-color pixel system are debugged according to the white color displayed at this time. The debugging procedure can be expressed by formulae (4) as follows:

$$\begin{cases} L_v(W_i) = Y(R_o) + Y(G_o) + Y(B_o) + Y(M_o) \\ x_i = (X(R_o) - X(G_o) + X(B_o) + X(M_o))/S \\ y_i = (Y(R_o) + Y(G_o) + Y(B_o) + Y(M_o))/S \\ M_o = f(R_o, G_o, B_o) \end{cases} \quad (4)$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + \\ Y(B_o) + Z(B_o) + X(M_o) + Y(M_o) + Z(M_o) \end{cases}$$

wherein $L_v(W_i)$ represents a brightness of a white color with a gray-scale value being i; $x_i$, $y_i$ represent chromaticity coordinates of the white color; $R_o,G_o,B_o,M_o$ represent output four color gray-scale values; $X(\square),Y(\square),Z(\square)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

Since during the debugging procedure, $M_o=f(R_o,G_o,B_o)$ is maintained all the time, the output gray-scale value of each sub pixel unit can be obtained directly. This method is applicable for white balance debugging with a high requirement for debugging accuracy thereof.

The gray-scale values $R_o,G_o,B_o,M_o$ of each sub pixel unit obtained by the method according to the embodiment of the present disclosure can form a 256*4 dimensional white balance matrix corresponding to each input gray-scale value i, and the white balance matrix is stored in the four-color pixel system in a form of a lookup table. Since each gray-scale value in the white balance matrix is in accordance with the three-color to four-color calculation algorithm in the four-color pixel system when white balance is achieved in the system, a display effect of the four-color pixel system can be significantly improved.

Moreover, the white balance method of the four-color pixel system according to the embodiment of the present disclosure is applicable for all existing four-color pixel system, and the fourth sub pixel unit is not defined. The fourth sub pixel unit can be a yellow (Y) sub pixel unit, a white (W) sub pixel unit, or other kinds of sub pixel unit.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A white balance method of four-color pixel system, wherein the four-color pixel system comprises a red sub pixel unit, a green sub pixel unit, a blue sub pixel unit, and a fourth sub pixel unit; and wherein the method comprises following steps:

lightening, by a processing circuit, a plurality of sub pixel units according to two different combinations respectively based on an input white gray-scale value so as to display a white color;

regulating, by a driving circuit, gray-scale values of each of the sub pixel units, and taking, by the processing circuit, the regulated gray-scale values of each of the sub pixel units, which enable the white color displayed by two different combinations to meet respective preset conditions, as an output four color gray-scale values corresponding to the input white gray-scale value, wherein gray-scale values of the red sub pixel unit, the green sub pixel unit, and the blue sub pixel unit, which enable a brightness of a white color displayed by a first combination to be equal to a brightness of a white color corresponding to the input white gray-scale value and in accordance with a Gamma curve, and a chromaticity coordinate of a white color displayed by a second combination to be equal to a chromaticity coordinate of a benchmark white color, are taken as an output gray-scale value corresponding to the input white gray-scale value.

2. The method according to claim 1, wherein an output gray-scale value of the fourth sub pixel unit is obtained according to a three-color to four-color calculation algorithm of the four-color pixel system and based on the output gray-scale values of the red sub pixel unit, the green sub pixel unit, and the blue sub pixel unit.

3. The method according to claim 2, wherein during a regulation procedure of the gray-scale value of each sub pixel unit, a mapping relationship between the gray-scale value of the fourth sub pixel unit and the gray-scale values of the red sub pixel unit, the green sub pixel unit, and the blue sub pixel unit is maintained in accordance with the three-color to four-color calculation algorithm of the four-color pixel system.

4. The method according to claim 3, wherein during the regulation procedure of the gray-scale value of each sub pixel unit, the gray-scale value of the fourth sub pixel unit is maintained unchanged.

5. The method according to claim 4, wherein the first combination comprises the red sub pixel unit, the green sub pixel unit, the blue sub pixel unit, and the fourth sub pixel unit, and the second combination comprises the red sub pixel unit, the green sub pixel unit, and the blue sub pixel unit.

6. The method according to claim 5, wherein the brightness of the white color displayed by the first combination is obtained according to stimulus values Y of each of the sub pixel units of the first combination which are measured by a measuring device, and the chromaticity coordinate of the white color displayed by the second combination is obtained according to tri-stimulus values XYZ of each of the sub pixel units of the second combination which are measured by the measuring device.

7. The method according to claim 6, wherein the gray-scale value of each sub pixel unit is regulated according to formulas as follows:

$$\begin{cases} L_v(W_i) = Y(R_o) + Y(G_o) + Y(B_0) + Y(M_i) \\ x_i = (X(R_o) + X(G_o) + X(B_o))/S \\ y_i = (Y(R_o) + Y(G_o) + Y(B_o))/S \\ M_i = f(R_i, G_i, B_i) \\ M_o = f(R_o, G_o, B_o) \end{cases},$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + Y(B_o) + Z(B_o) \end{cases}$$

wherein $L_v(W_i)$ represents a brightness of a white color with a gray-scale value being i; $x_i$, $y_i$ represent chromaticity coordinates of the white color; $R_i, G_i, B_i, M_i$ represent four color gray-scale values obtained through an input three color gray-scale value after conversion according to the three-color to four-color calculation algorithm; $R_o, G_o, B_o, M_o$ represent output four color gray-scale values; $X(g), Y(g), Z(g)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

8. The method according to claim 3, wherein during the regulation procedure of the gray-scale values of each of the sub pixel units, the mapping relationship between the gray-scale value of the fourth sub pixel unit and the gray-scale values of the red sub pixel unit, the green sub pixel unit, and the blue sub pixel unit is maintained unchanged.

9. The method according to claim 8, wherein the brightness of the white color displayed by the first combination is obtained according to stimulus values Y of the red sub pixel unit, the green sub pixel unit, the blue sub pixel unit, and the fourth sub pixel unit, and the chromaticity coordinate of the white color displayed by the second combination is obtained according to tri-stimulus values XYZ of each of the four sub pixel units.

10. The method according to claim 9, wherein the gray-scale value of each sub pixel unit is regulated according to a formula as follows:

$$\begin{cases} L_v(W_i) = Y(R_o) + Y(G_o) + Y(B_o) + Y(M_o) \\ x_i = (X(R_o) - X(G_o) + X(B_o) + X(M_o))/S \\ y_i = (Y(R_o) + Y(G_o) + Y(B_o) + Y(M_o))/S \\ M_o = f(R_o, G_o, B_o) \end{cases},$$

and $$\begin{cases} L_v(W_i)/L_v(W_{255}) = (i/255)^{2.2} \\ S = X(R_o) + Y(R_o) + Z(R_o) + X(G_o) + Y(G_o) + Z(G_o) + X(B_o) + Y(B_o) + Z(B_o) + X(M_o) + Y(M_o) + Z(M_o) \end{cases}$$

wherein $L_v(W_i)$ represents a brightness of a white color with a gray-scale value being i; $x_i$, $y_i$ represent chromaticity coordinates of the white color; $R_o, G_o, B_o, M_o$ represent output four color gray-scale values; $X(g), Y(g), Z(g)$ represent tri-stimulus values of each sub pixel unit; and f represents a mapping relationship from the gray-scale values of the red sub pixel unit, the green sub pixel unit, and the blue sub pixel unit to the gray-scale value of the fourth sub pixel unit which is in accordance with the three-color to four-color calculation algorithm.

11. The method according to claim 1, wherein the fourth sub pixel unit comprises a yellow sub pixel unit or a white sub pixel unit.

\* \* \* \* \*